United States Patent [19]

Tetreault et al.

[11] Patent Number: 5,555,372
[45] Date of Patent: Sep. 10, 1996

[54] FAULT-TOLERANT COMPUTER SYSTEM EMPLOYING AN IMPROVED ERROR-BROADCAST MECHANISM

[75] Inventors: Mark D. Tetreault, Northborough; Charles J. Horvath, Concord; William I. Leavitt, Grafton, all of Mass.

[73] Assignee: Stratus Computer, Inc., Marlborough, Mass.

[21] Appl. No.: 360,414

[22] Filed: Dec. 21, 1994

[51] Int. Cl.⁶ .............................. G06F 11/14; G06F 11/30
[52] U.S. Cl. ................. 395/182.13; 395/184.01; 395/185.01; 395/185.1
[58] Field of Search ......................... 395/182.13, 182.16, 395/182.09, 183.07, 183.19, 183.2, 184.01, 185.01, 185.02, 185.09, 185.1, 181

[56] References Cited

U.S. PATENT DOCUMENTS

| 4,453,215 | 6/1984 | Reid | 371/68.1 |
| 4,486,826 | 12/1984 | Wolff et al. | 371/68.1 |
| 4,750,177 | 6/1988 | Hendrie et al. | 371/32 |
| 5,276,823 | 1/1994 | Cutts, Jr. et al. | 395/182.09 |
| 5,361,267 | 11/1994 | Godiwala et al. | 371/40.1 |

Primary Examiner—Hoa T. Nguyen
Attorney, Agent, or Firm—Cesari and McKenna

[57] ABSTRACT

A bus device (10) the communicates with other bus devices (12, 13) on a communication channel (14) that includes a plurality of duplicated information buses (16, 17) selectively assumes bus-selection states in which it uses information from one or the other of the buses (16, 17). It also monitors the buses (16, 17) for errors in the information that the buses (16, 17) carry, and it broadcasts an error signal over other lines (18) of the communications channel (14) in response to detection of such an error, but only if an error occurs in information on the bus that its current bus-selection state designates. On the other hand, when an error-broadcast signal indicating an error on either bus in the information transmitted by that device (10) appears on the bus, that bus device (10) retransmits the information, regardless of that device's current bus-selection state. Inconsistent operation phasing among bus devices that have assumed different bus-selection states is thereby avoided.

23 Claims, 5 Drawing Sheets

FAULT-TOLERANT COMPUTER SYSTEM EMPLOYING AN IMPROVED ERROR-BROADCAST MECHANISM

BACKGROUND OF THE INVENTION

The present invention is directed to fault-tolerant data processing systems and in particular to recovery from detected errors in systems that employ duplicated communications buses.

Fault-tolerant data-processing systems employ various types of redundancy in order to maintain availability in spite of single faults. One type of redundancy employed in certain such systems is the use of duplicated communications buses for conveying signals among devices coupled to those buses. In the absence of errors, bus devices that transmit information over the buses transmit identical signals over both buses, typically simultaneously. (There are usually only two duplicated buses, but those skilled in the art will appreciate that the teachings of the invention to be described below are also applicable to arrangements that use more than two "duplicated" buses.) Devices that use the information placed on the bus by a transmitting device typically take their information from only a selected one of the buses at any given time, but the bus selection may change if an error condition occurs. For instance, if an error is detected in the information on one of the buses, the bus devices may assume a state in which they thereafter "obey" (i.e., use the information from) the other duplicated bus.

This approach obviously depends on detecting errors, and circuitry for detecting errors can take many forms. The information placed on the buses can be encoded for error detection, for example, and the bus devices can monitor the bus information so as to detect code violations. Another approach is to compare bus-driver inputs with actual bus signals.

Particularly when the latter mechanism is employed, a device that detects an error must communicate that error's occurrence to all devices that may use information from the buses at one time or another. This may be done, for instance, by means of error-signal-carrying lines, which also form part of the devices' communications channel but may be separate from the duplicated buses. Such lines are generally provided with their own fault-tolerating mechanisms. For instance, error-indicating lines can be "triplicated" so that devices receiving signals on the triplicated error-indicating lines can ascertain their intended contents by majority vote.

If the bus devices are currently "obeying" the bus on which the information was found to be in error, they do not use that information but instead employ some error-recovery mechanism to insure that the information they use is correct. This often involves having the transmitting device retransmit the information.

In this context, retransmission does not necessarily consist of transmitting exactly the same information. For instance, the transmitting device may actually be, for instance, a pair of identical partnered devices that drive the bus in unison. In response to certain further error-detection circuitry, it may be concluded that the fault lies in one of the two partners, and the defective partner "removes" itself from the bus before transmission again occurs. So the retransmitted information differs from the originally transmitted information in that it is not corrupted by the defective partner.

In other cases, the retransmitted information is the same, but the information actually used is not. Specifically, if a receiving device has previously been "obeying" the bus on which the error occurred, the occurrence of an error on that bus will often cause it to change its "obey" state so that on retransmission it uses the information from the other bus, which typically is not in error.

In short, the strategy employed in such fault-tolerant systems is to have many devices check for errors and have them notify all devices when an error occurs on any bus. This enables a bus device to take appropriate action whenever it is notified of an error on the bus that it obeys. The resulting operation is quite robust in the face of various types of faults that would otherwise result in erroneous operation.

SUMMARY OF THE INVENTION

But we have recognized that this conventional way of reacting to bus errors is vulnerable to loss of synchronism during system reconfiguration and that this vulnerability can be eliminated in a way that is simple and practical.

To understand the vulnerability of the conventional approach, consider a system having duplicated buses referred to as the A bus and the B bus. Further assume that all devices are in the state in which they obey the B bus. It is typical that at any given time the bus selected by all devices is the same, since all the devices receive the same channel signals, and they determine their respective obey states from certain of those signals in accordance with the same protocol. That is, since the recent history for the signals is the same for all of the devices, the obey state that they have assumed is also the same.

But consider what happens in the absence of the present invention when a new device comes on line. This is not an uncommon occurrence in fault-tolerant systems; because such systems are used in applications that require high availability, they are usually configured to keep operating even when new devices are added or old ones removed. Not having the same recent bus-signal experience as the other bus devices, the new device could be obeying the A bus while the others are obeying the B bus.

Now, a device conventionally reacts only to errors that occur on the bus that it is currently obeying, even though all errors are broadcast to all devices. So when an old device transmits information to the new device (over both buses, since transmission, as opposed to reception, is independent of the obey state), a resultant error on the A bus will not cause the old device to retransmit, whereas the new device, being in the obey-A state, will react to that error and misinterpret subsequent bus signals as being part of a retransmission. Miscommunication would likely result.

Without the teachings of our invention, this result would seem to be unavoidable as a practical matter: if instead all devices involved in an operation performed the retransmission step whenever an error was detected on either bus, a "hard" error on one of the buses would effectively stop operation of the whole system, since it would force endless retransmission. But we have discovered that, paradoxically, operation can be even more robust if other devices are not always notified of all errors. In accordance with our invention, the error-detecting circuitry incorporated in a device's bus interface will not notify the other devices of an error on a bus unless it detects an error on the bus that the error-detecting device is currently "obeying."

Although this at first appears to limit the fault-recovery mechanism, it is actually advantageous: it allows the protocol to be adjusted so that a bus device will follow a retransmission procedure in response to any error-broadcast signal, regardless of whether the indicated error is on the bus that the device currently is obeying. This takes care of the problem presented by different devices' being in different obey states, but under conventional approaches it would have permitted a hard error essentially to freeze bus communication.

In accordance with our invention, on the other hand, the devices can perform the retransmission steps whenever they receive notification of an error on either bus, because those notifications will stop as soon as the obey states of all of the devices are the same and associated with a functioning bus.

BRIEF DESCRIPTION OF THE DRAWINGS

These and further features and advantages of the present invention are described below in connection with the accompanying drawings, in which.

DETAILED DESCRIPTION OF AN ILLUSTRATIVE EMBODIMENT

The present invention is directed to the manner in which a fault-tolerant data processing system determines when to perform a recovery operation after an error has been detected. The particular manner in which error detection occurs—and, indeed, the particular type of recovery action employed in response—are not critical to the invention. But some appreciation of the environment in which the invention is used is desirable in order to understand the invention itself. We will therefore begin with a description of one type of fault-tolerant system to which the present invention can be applied.

Figure 1:
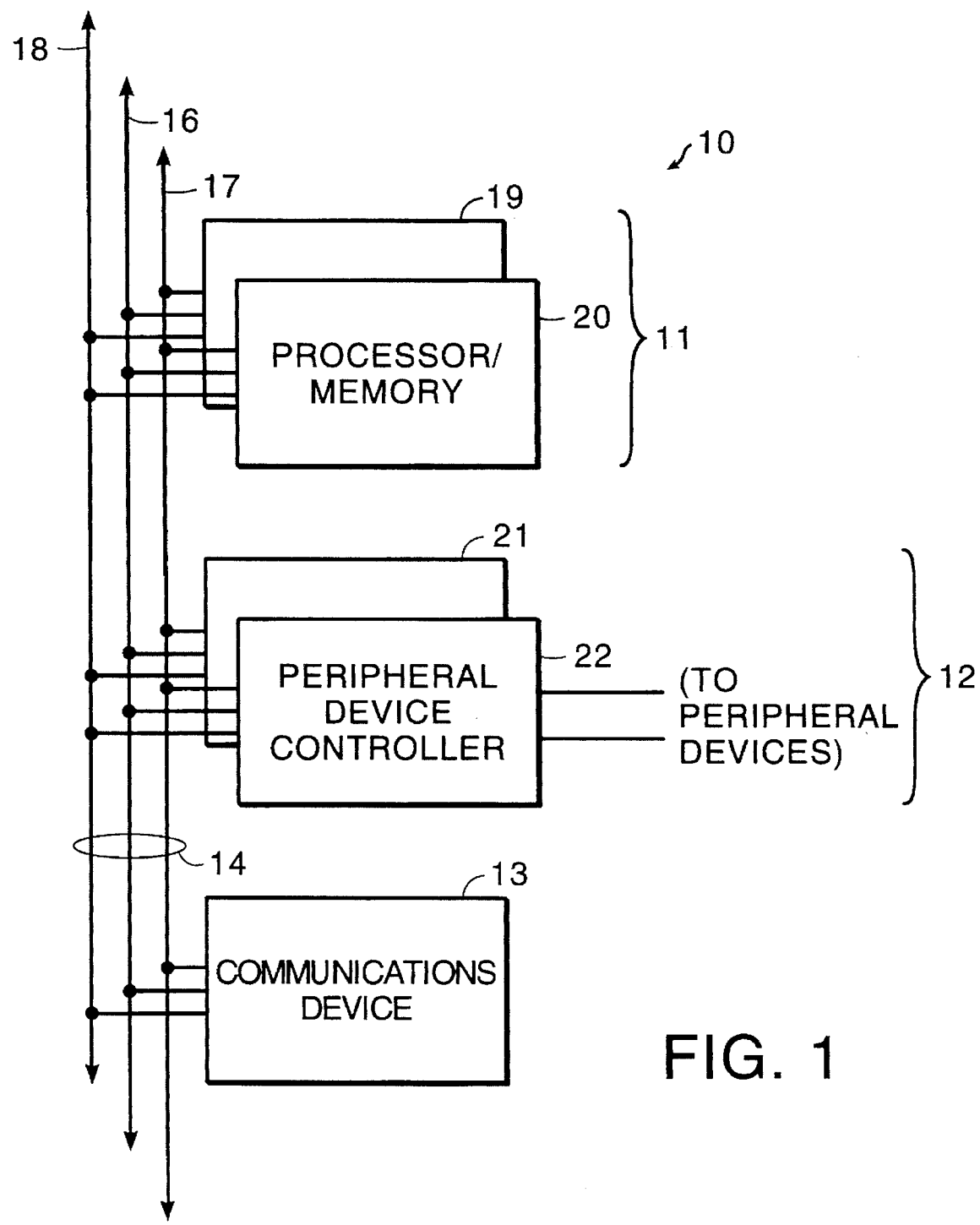
FIG. 1 is a block diagram showing the coupling of various bus devices to a communications channel in a fault-tolerant system.

FIG. 1 depicts elements of a fault-tolerant data-processing system 10. Various bus devices 11, 12, and 13 communicate with one another by means of a communications channel 14. Although the channel 14 would ordinarily be called a "bus," confusion will be avoided if we reserve the term bus in the present context for each of two identical subsets 16 and 17 of the communications channel's signal lines.

The present invention is applicable to systems generally that employ such duplicated buses, but not all of the channel's signal lines need to be duplicated in that manner, and FIG. 1 depicts a further signal-line set 18. In an exemplary system in which the invention is employed, signal lines 18, too, are provided redundantly. This is not central to the present invention. Nor are particular contents of the various lines of buses 16 and 17. But for the sake of concreteness we will assume that buses 16 and 17 contain information such as data, addresses, and operation codes, while the further channel lines 18 carry timing and low-level "handshake" signals. The purpose of the invention is to determine how to implement a recovery scheme that takes advantage of the redundancy between bus 16, which will occasionally be referred to as the A bus, and bus 17, which will at times be referred to as the B bus.

Bus device 11 is depicted as actually comprising two identical devices 19 and 20, which operate identically in a lock-stepped fashion. Device 12 is similarly depicted as comprising partner devices 21 and 22. This device redundancy is typical of systems in which the teachings of the present invention will be employed, but it is not necessary, as is exemplified by device 13, which is not depicted as comprising partners. Indeed, partnered and single-instance devices may both be employed in the same system.

Figure 2:
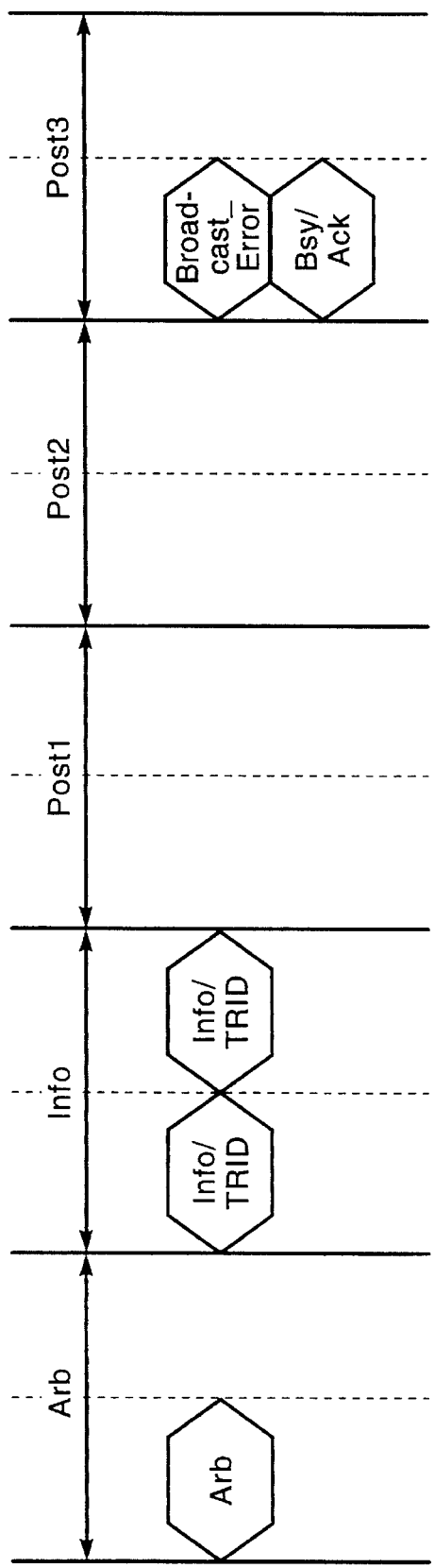
FIG. 2 is a timing diagram illustrating a bus operation.
Figure 2:
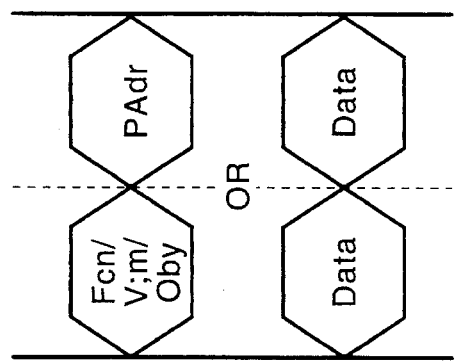
Figure 2:
Figure 3:
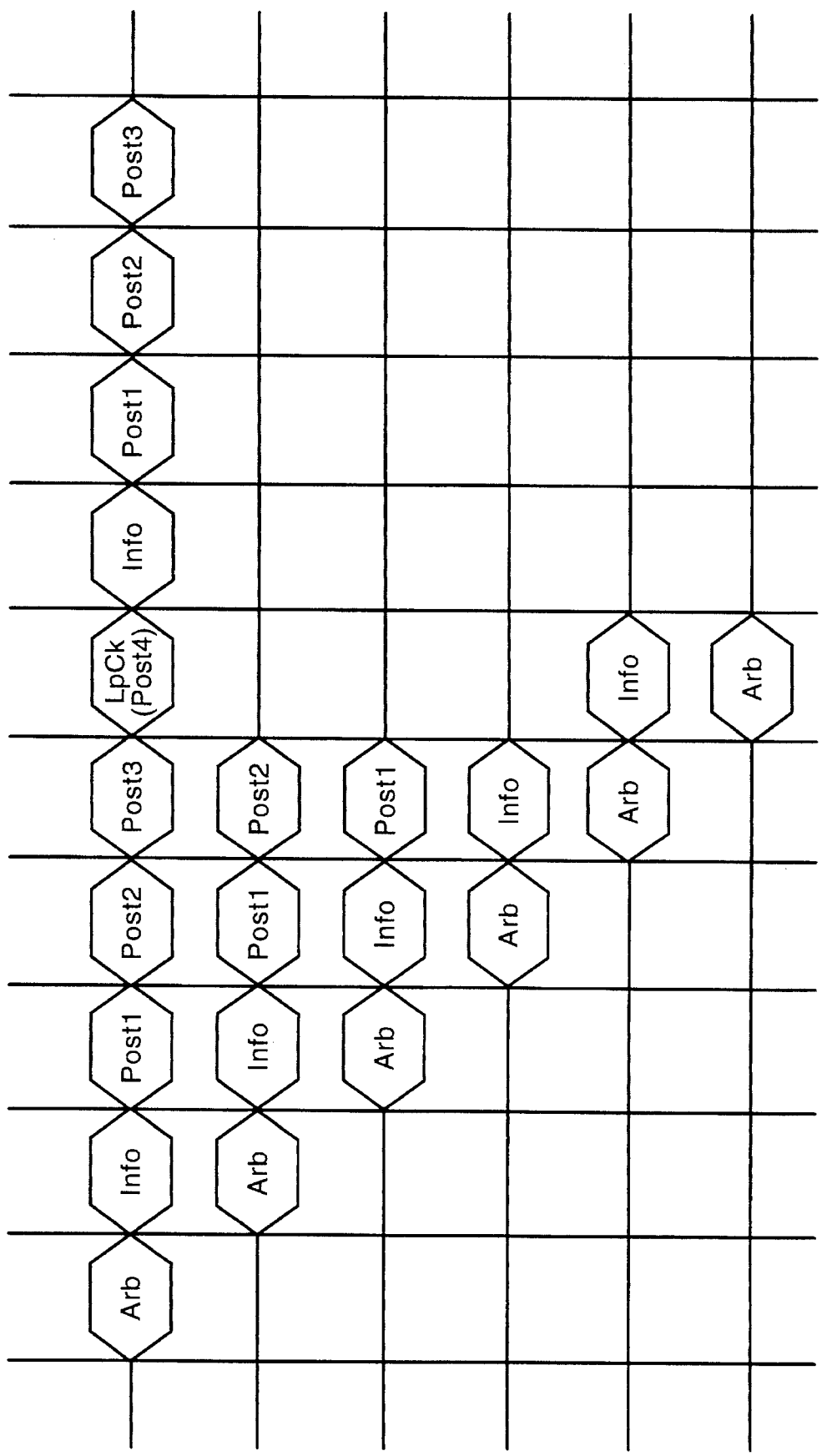
FIG. 3 is a further timing diagram depicting the pipelined nature of operations on the bus and illustrating the operation timing that results when one device communicates its detection of an error to other bus devices.

In accordance with one aspect of the invention, the error-recovery mechanism that is employed when an error is detected on the bus involves retransmission. FIG. 2 depicts a possible type of operation timing in which a retransmission mechanism may be employed, while FIG. 3 depicts the manner in which such operations can be pipelined. According to the protocol employed by way of example, data information is multiplexed with address information: each is transmitted over the same bus lines, but they are transmitted in separate "operations," of which a plurality are usually required to make up a complete bus transaction such as one in which data from one device are written into another. Various signal changes occur in accordance with time slots defined by timing signals broadcast on, say, one or more of lines 18.

In the illustrated protocol, these time slots occur in "phases," each of which consists of two "cycles." FIG. 2 depicts the typical operation as lasting for five phases, which are referred to as "Arb," "Info," "Post1," "Post2," and "Post3." As FIG. 2 shows, arbitration occurs during the first cycle of the Arb phase, in which the various devices requiring access to the bus place arbitration-request signals onto certain channel lines provided for that purpose. For the sake of concreteness, we will assume that the arbitration lines are among lines 18 (FIG. 3). By observing which of the arbitration lines have been asserted, the various bus devices employ a predetermined arbitration protocol to agree on which device is to be the "master."

During the second, Info phase, the master, or a device that the master has designated in a previous operation, places information on the duplicated buses 16 and 17 (FIG. 1). If the information placed on those lines during the Info phase is data, the information is the same during both cycles of the Info phase. If it is an address, it is present during only the second cycle, being preceded in the first cycle by function-indicator, transaction-identifier, and other signals, collectively designated "TRID" in FIG. 2, that are necessary to specify the operation. Regardless of the type of information, the present invention is directed to the manner in which the system responds to errors that occur in its transmission.

The transmitting device places no signals on the bus during the next two phases, namely, Post1 and Post2. During this time, devices on the bus will be determining whether they have observed any errors in the transmission that occurred during the Info phase. Also, a device designated a slave by the master will be determining whether it can participate in the requested transaction. If it can, it sends an acknowledgement signal during the next, Post3 phase. Otherwise it sends a busy signal. In either case, devices that have detected errors will, under certain circumstances, broadcast that fact to the other bus devices by asserting a Broadcast_Error signal. If no Broadcast_Error signal is asserted during the first cycle of Post3, the receiving device is free to use the information that was transmitted during the Info phase. The source of the present invention's advantages lies in its determination of whether to send the Broadcast_Error signal and whether to respond to it.

Before we turn to a description of that feature, however, we will describe an example of a recovery mechanism that can be triggered by operation of the present invention. For this purpose, we describe the system's pipelined nature by reference to FIG. 3. FIG. 3 is a timing diagram similar to FIG. 2, but it does not separately show the two cycles of which each phase consists, and it shows that the communications channel is operated in accordance with a pipelined protocol, in which various operations overlap.

The first operation, depicted on FIG. 3's top line, is shown to include the five usual phases, Arb through Post3. In the second line of FIG. 3 it can be seen that arbitration for a second operation occurs (on lines 18 of FIG. 1) simultaneously with transmission of information for the first operation (on buses 16 and 17 of FIG. 1). Information for the second operation is transmitted during the next time slot, during which arbitration for yet another operation occurs. FIG. 3 shows the beginnings of six overlapped operations.

Ordinarily, all operations thus pipelined proceed to completion. But FIG. 3 shows what happens if Broadcast_Error signals are transmitted during the first operation's Post3 phase, typically on channel lines dedicated to that purpose. One result is that the operation in whose Post3 phase that error signal was transmitted is extended by at least five more phases. If the other operations continued under such circumstances, of course, data would be corrupted by attempts of more than one device to place conflicting information on the same channel lines. So all bus devices react to the error signal by aborting any other operation in progress: the "pipeline" is "flushed."

As to the original operation, namely, the one in whose Post3 phase an error signal occurred, the bus devices perform certain diagnostic operations during a further, Post4 phase, and the transmitting device then places the information on buses 16 and 17 during a second Info phase. This is referred to as "retransmission," and it can be thought of as another attempt by that device to send the same information. In the interim, however, corrective action will usually have been taken so that the information actually transmitted or accepted is not necessarily the same.

For example, partner 19 in duplicated device 11 of FIG. 1 may determine that it has become defective. This may be a result of the Broadcast_Error signal—or, possibly, a cause of it. In either event, partner 19 would respond by "removing" itself from the bus, i.e., by switching its bus drivers to their high-impedance ("tri-stated") condition. The result may be that the buses carry information in the second Info phase that differs from that which they carried during the first Info phase. Alternatively, the information carried by the buses may be the same, but the devices may in the interim have switched from using the information on the A bus 16 to using that on the B bus 17, typically in response to an inference that the A bus is not currently reliable. In either case, the receiving device will use the information on the bus that it obeys during the second Info phase in place of the information transmitted on the bus that it obeyed during the first Info phase.

Figure 4:
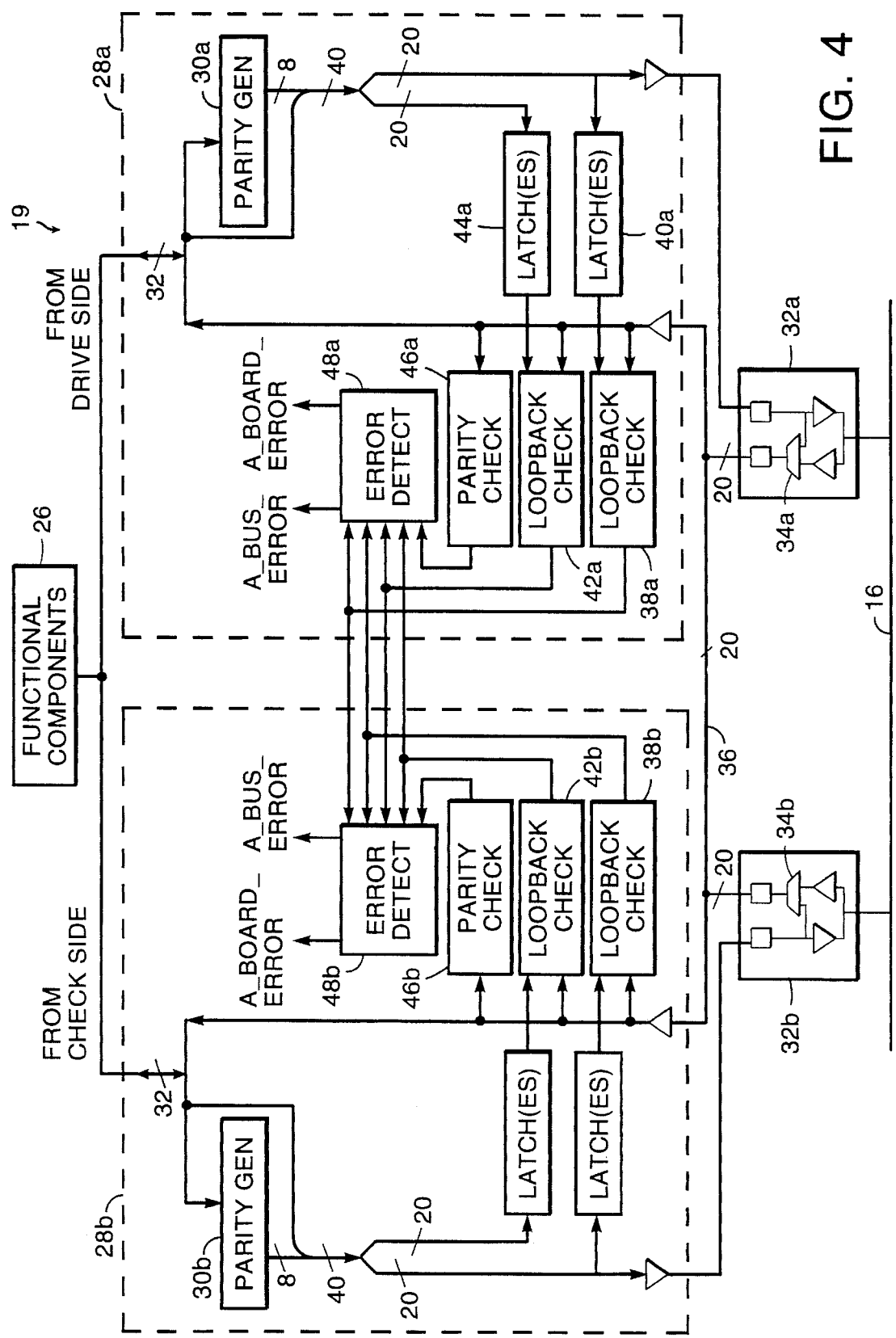
FIG. 4 is a block diagram showing a part of a bus device's interface to one of the redundant buses on the communications channel.

For an example of how errors may be detected, we consider an exemplary arrangement for transmitting signals over the channel. Specifically, FIG. 4 depicts part of the circuitry employed by one of the bus devices to place information signals on one of the buses, say, the A bus. Let us suppose that the interface circuitry depicted in FIG. 4 is part of bus device 19, which may, for instance, be a processor or memory. The same device 19 includes a similar interface, not shown, for communication over the B bus. And its partner, device 20, includes identical interface circuitry for communicating over both buses.

Circuitry within various of device 19's functional components 26 applies signals to the depicted interface, which in the illustrated arrangement includes two complementary halves 28a and 28b. Both halves receive the same thirty-two-bit word from the functional circuitry 26, and each employs a parity generator 30 to add eight parity bits and bring the total to forty bits. (In describing functions that are the same for both halves, we will employ reference numerals without letter suffixes.) The resultant forty bits are the same in both halves, but a transceiver unit 32a in one half applies only twenty bits to the bus, while a transceiver 32b in the other half applies the other twenty bits.

Now, all of the devices monitor the bus in some fashion so as to detect errors. To this end, transceivers 32a and 32b together receive the forty bus bits and apply them through multiplexors 34a and 34b to "loopback" lines 36. (Although loopback lines 36 in effect carry forty bits, FIG. 4 accurately depicts them as consisting of twenty lines, since the twenty-bit outputs of the two multiplexors 34a and 34b are time-division multiplexed onto the loopback lines 36.)

The loopback lines 36 carry signals that are used to determine (1) whether parity is correct in the information retrieved from the bus and (2) whether the bus actually contains the signals that the device intended to place on it. For the latter purpose, a loopback-check circuit 38a receives from latches 40a the twenty bits applied by parity generator 30a to transceiver 32a, and it compares them with the twenty loopback-line bits from the bus lines that transceiver 32a drives. That is, it determines whether twenty of the bus lines do indeed carry the signals that transceiver 32a is supposed to apply to them. Similarly, another loopback-check circuit 42a makes a comparison of the other bus bits with the corresponding bits (captured by latches 44a) from parity generator 30a that transceiver 32a did not apply.

Loopback-check circuits 38b and 42b perform the complementary operation, so the bus contents are thoroughly examined to determine whether they are what the bus device intended to place on the bus. Additionally, parity-checking circuitry 46 checks the parity of the bus contents by generating eight parity bits from the thirty-two non-parity bits on loopback lines 36 and comparing them with the line-36 parity bits.

To draw diagnostic inferences from the outputs of the parity-check circuits 46 and the loopback-check circuits 38 and 40, the interface circuitry includes error-detection circuits 48. One of the purposes of the error-detection circuit 48 is to determine whether any error detected by the loopback-check and parity-check circuits is symptomatic of a fault in the device's processing section. This is done by comparing corresponding outputs from the two halves.

For example, if loopback circuits 42a and 38b agree that, say, the bits driven onto the bus by transceiver 32b are in error, while circuits 38a and 42b agree that, say, the bits driven by transceiver 32a are correct, circuits 48 conclude from this agreement that the detected error was not caused by the part of device ("board") 19 that drives the A bus, so they do not assert their respective A_Board_Error signals. (So long as circuits 38, 42, 46, and 48 are operating properly, the two A_Board_Error signals are the same.)

If the loopback circuits do not agree, on the other hand, then the error-detection circuits 48 assert an A_Board_Error signal, which indicates that the bus error has its source in the device itself. A typical response to this signal is for device 19 to "remove" itself in favor of its partner, device 20.

Regardless of these comparisons' results, detection circuits 48 assert A_Bus_Error whenever the loopback-check or parity-check circuits indicate an error of any kind. (In the description that follows we will occasionally refer to such an indication as detection of an error on the A bus, even though, as was just explained, the error may be in the bus device rather than in the actual bus signals.) The circumstances in which such an assertion results in broadcast of an error message to other bus devices will now be explained by reference to FIG. 5.

Figure 5:
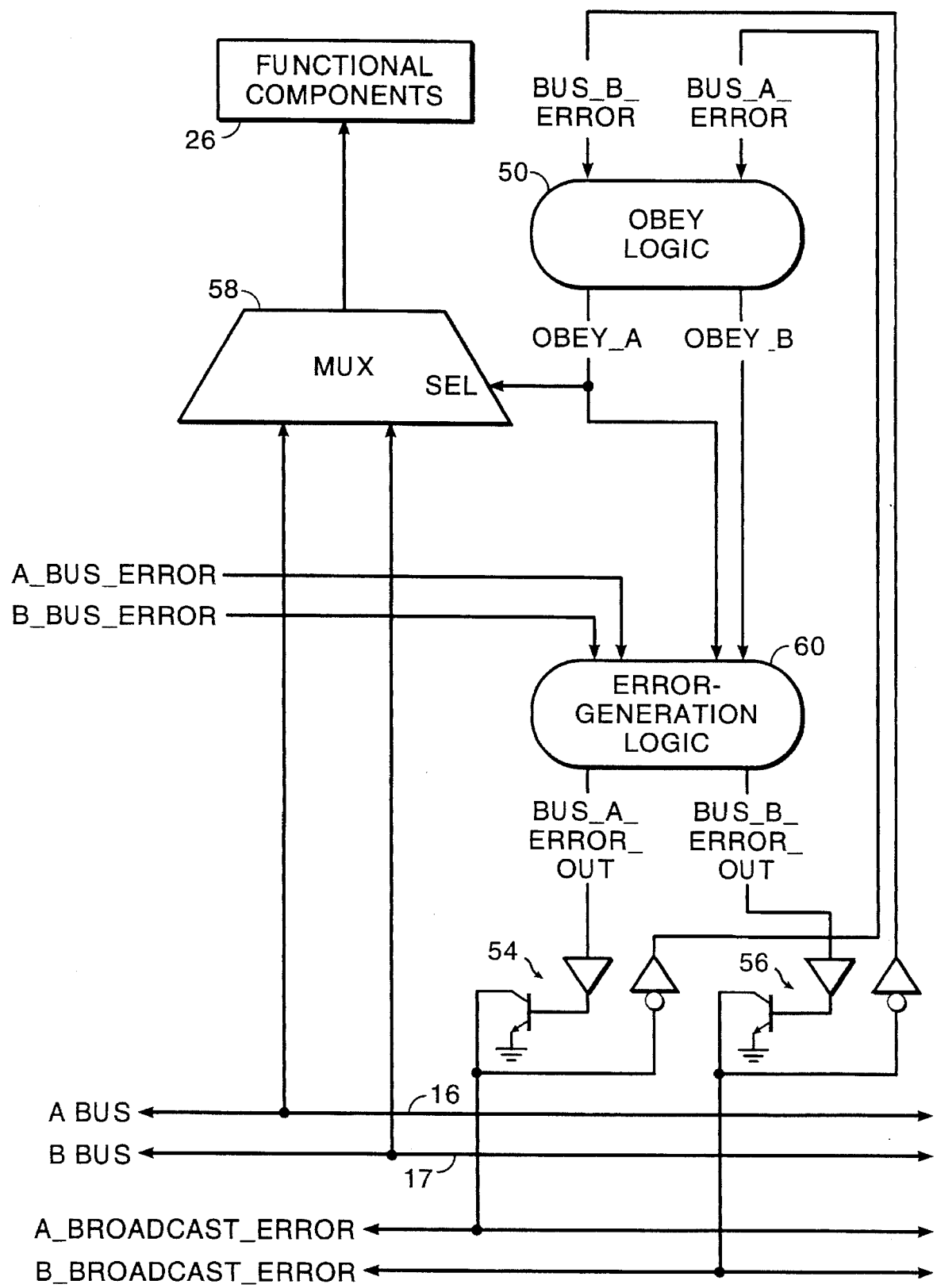
FIG. 5 is a block diagram of the part of the interface that broadcasts the subject device's error detection and reacts to error detection by other devices.

Like the A_Board_Error signals, the A_Bus_Error signals from error-detection circuits 48a and 48b should be identical, so only one instance of that signal appears in FIG. 5 rather than two as in FIG. 4. On the other hand, FIG. 5 also depicts a signal line that FIG. 4 does not, namely, the B_Bus_Error line. This signal is generated in the same manner as the A_Bus_Error signal is, but it comes from device 19's B bus interface (not shown) rather than the illustrated A bus interface.

FIG. 5 shows the manner in which device 19 decides from which bus to take the information that it will use. An obey-logic state machine 50 generates two binary output signals Obey_A and Obey_B in response to signals A_Broadcast_Error and B_Broadcast_Error, which are carried by respective ones of lines 24 (FIG. 1) of the communications channel. These are the lines on which bus devices broadcast their detection of bus errors. Bus drivers 54 and 56 in FIG. 5, for example, drive the A_Broadcast_Error and B_Broadcast_Error lines, respectively. Bus drivers 54 and 56 are open-collector drivers, so they form a wired-OR configuration with corresponding bus drivers on other bus devices.

When the device is initialized or reset, Obey_A and Obey_B are both asserted. But if an error occurs, the obey-logic circuit 50 changes state in accordance with the following table:

Note that the illustrated embodiment additionally asserts the error-broadcast signal corresponding to the non-selected bus if errors are detected on both buses. This feature is not essential to the present invention, but we have found it to be advantageous.

The advantage of the invention is that when the A_Broadcast_Error and B_Broadcast_Error signals are generated in this manner, all devices can follow the retransmission protocol depicted on the top line of FIG. 3 whenever they receive either A_Broadcast_Error or B_Broadcast_Error, regardless of their obey states. So if a situation develops in which different devices are in different obey states, an error that occurs on one bus but not on the other will not result in one device's entering a retransmission protocol when the other does not, and it thus avoids the resultant bus conflicts.

| A_BROADCAST_ERROR | B_BROADCAST_ERROR | OBEY_A | OBEY_B |
|---|---|---|---|
| 0 | 0 | UNCHANGED | UNCHANGED |
| 0 | 1 | 1 | 0 |
| 1 | 0 | 0 | 1 |
| 1 | 1 | UNCHANGED | UNCHANGED |

A multiplexor 58 for, yards to the functional components the contents of the A bus if Obey_A is asserted but Obey_B is not, and it forwards the contents of the B bus if Obey_B is asserted but Obey_A is not. In the particular embodiment depicted in the drawings, multiplexor 58 forwards the A bus information if both of the obey signals are asserted. That is, if Obey-A is asserted, the bus-selection state is independent of the value of Obey_B, and the B bus is the selected bus only if Obey_A is not asserted. Obviously, however, this arrangement is not required in order to practice the teachings of the present invention.

As was stated before, bus drivers 54 and 56 are used to broadcast error-detection information over the A_Broadcast_Error and B_Broadcast_Error lines. In accordance with the present invention, however, device 19 does not always assert A_Broadcast_Error when it detects a bus error on the A bus, nor does it invariably assert B_Broadcast_Error in response to detection of such an error on the B bus. Instead, error-generation logic 60 uses the A_Broadcast_Error or and B_Broadcast_Error signal to notify the other bus devices of such errors only if the bus error is detected on the bus whose Obey signal is asserted, as the following table indicates:

Of course, this rule of having all devices enter the retransmission protocol whenever an error is broadcast for either bus could, theoretically, be followed under the traditional error-broadcast approach, in which an error for a given bus is broadcast whenever it is detected. But it would not be practical to do so, since a hard error on one of the buses would result in an error's being broadcast at every Post3 phase and thus in having a single operation be prolonged indefinitely. With the error-broadcast approach of the present invention, on the other hand, the bus-error signal resulting from a single-bus error is broadcast only so long as any device is obeying that bus; as soon as all devices have again assumed a state in which they all obey a properly functioning bus, system operation continues, as it should, despite the error on one of the buses.

This approach has a wide range of applicability. For instance, although the description thus far describes only one type of error detection upon which a bus-error broadcast can be based, the particular type of error detection is not critical. Indeed, the example just described can be implemented only in devices that actually are currently driving the bus; only such devices "know" what the bus signals are supposed to be. But other devices also engage in error

| ERROR DETECTED ON A_BUS | ERROR DETECTED ON B_BUS | OBEY_A | OBEY_B | BUS_A_ERROR_OUT | BUS_B_ERROR_OUT |
|---|---|---|---|---|---|
| 0 | 0 | 1 | 1 | 0 | 0 |
| 0 | 1 | 1 | 1 | 0 | 1 |
| 1 | 0 | 1 | 1 | 1 | 0 |
| 1 | 1 | 1 | 1 | 1 | 1 |
| 0 | 0 | 1 | 0 | 0 | 0 |
| 0 | 1 | 1 | 0 | 0 | 0 |
| 1 | 0 | 1 | 0 | 1 | 0 |
| 1 | 1 | 1 | 0 | 1 | 1 |
| 0 | 0 | 0 | 1 | 0 | 0 |
| 0 | 1 | 0 | 1 | 0 | 1 |
| 1 | 0 | 0 | 1 | 0 | 0 |
| 1 | 1 | 0 | 1 | 1 | 1 | detection. For instance, a device can compare the signals on one bus with those on the other, infer an error from any difference, attribute that error to the bus carrying incorrect parity, and broadcast the message indicting an error on that bus. The present invention is still applicable, because the broadcast will take place only if that device is currently "obeying" a bus on which an error is detected.

Nor does this invention require that bus devices have the capability of being in both obey states simultaneously. For instance, a single bit, indicating whether the A bus or B bus is to be obeyed, could contain the total obey state. Additionally, although we have here referred to the buses as being "duplicated," there is no requirement that the number of duplicated buses be limited to two.

It is thus apparent that the present invention's teachings can be employed in a wide range of embodiments and thus constitutes a significant advance in the art.

I claim:

1. A digital data-processing system comprising:
   A) a communications channel, including a plurality of duplicated information-carrying buses, for carrying error-broadcast signals placed in the channel in response to detection of errors in the information that the duplicated buses carry; and
   B) a plurality of bus devices for alternatively assuming a plurality of bus-selection states, each of which is associated with a different one of the buses, the bus associated with the bus-selection state assumed by a bus device being denominated the bus selected by that bus device,
      i) at least one of the bus devices comprising a device for using, in the absence of an error-broadcast signal, information present at designated time slots on the bus selected by that bus device, but for responding to an error-broadcast signal representing an error in information placed on either bus during that time slot, regardless of whether that bus is the bus selected by that bus device, by using in place of that information the information carried by a bus in a different time slot,
      ii) at least one of the bus devices comprising a device for placing, when operating properly, identical information on all of the buses at the designated time slot and, in response to an error-broadcast signal indicating an error in information placed on any bus during that time slot, regardless of whether that bus is the selected bus, performing retransmission of that information in the different time slot, and
      iii) each of the bus devices monitoring for errors the bus selected by that bus device and applying to the communications channel an error-broadcast signal indicating the presence of an error on that bus in response to detection by that bus device of an error in the information thereon, but applying to the communications channel no error-broadcast signal indicating the presence of an error on any bus in the absence of detection by that bus device of an error on the bus selected by that bus device.

2. A digital data-processing system as defined in claim 1 wherein at least one of the bus devices applies to the communications channel error-broadcast signals indicating the presence of errors on all of the buses if that bus device detects errors on all of the buses.

3. A digital data-processing system as defined in claim 1 wherein the number of duplicated buses is two.

4. A digital data-processing system as defined in claim 3 wherein at least one of the bus devices applies to the communications channel error-broadcast signals indicating the presence of errors on all of the buses if that bus device detects errors on all of the buses.

5. A digital data-processing system as defined in claim 3 wherein each bus device, in the absence of an error-broadcast signal representing an error on a given bus not selected by that bus device, responds to an error-broadcast signal representing an error on the bus selected by that bus device by assuming the bus-selection state associated with the given bus.

6. A digital data-processing system as defined in claim 1 wherein at least one of the bus devices simultaneously monitors all of the duplicated buses for errors.

7. A digital data-processing system as defined in claim 1 wherein at least one of the bus devices includes bus drivers for receiving driver inputs and applying to the duplicated buses signals representing the driver inputs and wherein that at least one device monitors the duplicated buses for errors by comparing the driver inputs with the signals carried by the duplicated buses.

8. A digital data-processing system as defined in claim 7 wherein:
   A) the identical information placed on the duplicated buses includes parity information; and
   B) the way in which at least one of the bus devices monitors the bus selected thereby for errors is to monitor the information on the bus for incorrect parity.

9. A digital data-processing system as defined in claim 1 wherein:
   A) the identical information placed on the duplicated buses includes parity information; and
   B) the way in which at least one of the bus devices monitors the bus selected thereby for errors is to monitor the information on the bus for incorrect parity.

10. A digital data-processing system as defined in claim 1 wherein each bus device, in the absence of an error-broadcast signal representing an error on a given bus not selected by that bus device, responds to an error-broadcast signal representing an error on the bus selected by that bus device by assuming the bus-selection state associated with the given bus.

11. For use in a digital data-processing system comprising a communications channel, including a plurality of duplicated information-carrying buses, for carrying error-broadcast signals placed in the channel in response to detection of errors in the information that the duplicated buses carry, a bus device comprising:
   A) obey logic for causing the bus device alternatively to assume a plurality of bus-selection states, each of which is associated with a different one of the buses, the bus associated with the bus-selection state assumed by the bus device being denominated the bus selected by the bus device, and
   B) means for:
      i) in the absence of an error-detection signal, using information present at designated time slots on the selected bus, but
      ii) in response to an error-broadcast signal representing an error in information placed on either bus during that time slot, regardless of whether that bus is the bus selected by the bus device, using in place of that information the information carried by a bus in a different time slot.

12. A bus device as defined in claim 11 further including:
   A) error-detection circuitry for monitoring for errors the bus selected by the bus device; and
   B) error-broadcast circuitry for:
      i) applying to the communications channel an error-broadcast signal indicating the presence of an error on that bus in response to detection by the bus device of an error in the information thereon, but ii) applying to the communications channel no error-broadcast signal indicating the presence of an error on any bus in the absence of detection by the bus device of an error on the bus selected by the bus device.

13. A bus device as defined in claim 12 wherein the obey logic, in the absence of an error-broadcast signal representing an error on a given bus not selected by the bus device, responds to an error-broadcast signal representing an error on the bus selected by the bus device by assuming the bus-selection state associated with the given bus.

14. A bus device as defined in claim 11 wherein the obey logic, in the absence of an error-broadcast signal representing an error on a given bus not selected by the bus device, responds to an error-broadcast signal representing an error on the bus selected by the bus device by assuming the bus-selection state associated with the given bus.

15. For use in a digital data-processing system comprising a communications channel, including a plurality of duplicated information-carrying buses, for carrying error-broadcast signals placed in the channel in response to detection of errors in the information that the duplicated buses carry, a bus device comprising:
   A) obey logic for causing the bus device alternatively to assume a plurality of bus-selection states, each of which is associated with a different one of the buses, the bus associated with the bus-selection state assumed by the bus device being denominated the bus selected by that bus device;
   B) error-detection circuitry for monitoring for errors the bus selected by the bus device; and
   C) error-broadcast circuitry for:
      i) applying to the communications channel an error-broadcast signal indicating the presence of an error on that bus in response to detection by that bus device of an error in the information thereon, but
      ii) applying to the communications channel no error-broadcast signal indicating the presence of an error on any bus in the absence of detection by that bus device of an error on the bus selected by that bus device.

16. A bus device as defined in claim 15 wherein the obey logic, in the absence of an error-broadcast signal representing an error on a given bus not selected by the bus device, responds to an error-broadcast signal representing an error on the bus selected by the bus device by assuming the bus-selection state associated with the given bus.

17. A bus device as defined in claim 15 wherein the error-broadcast circuitry applies to the communications channel error-broadcast signals indicating the presence of errors on all of the buses if error-detection circuitry detects errors on all of the buses.

18. A bus device as defined in claim 15 wherein:
   A) the bus device includes bus drivers for receiving driver inputs and applying to the duplicated buses signals representing the driver inputs; and
   B) the error-detection circuitry monitors the duplicated buses for errors by comparing the driver inputs with the signals carried by the duplicated buses.

19. A bus device as defined in claim 18 wherein the way in which the error-detection circuitry monitors the bus selected thereby for errors is to monitor the bus information for incorrect parity.

20. A bus device as defined in claim 15 wherein the way in which the error-detection circuitry monitors the bus selected thereby for errors is to monitor the bus information for incorrect parity.

21. For use in a digital data-processing system comprising a communications channel, including a plurality of duplicated information-carrying buses, for carrying error-broadcast signals placed in the channel in response to detection of errors in the information that the duplicated buses carry, a bus device comprising:
   A) obey logic causing the bus device alternatively to assume a plurality of bus-selection states, each of which is associated with a different one of the buses, the bus associated with the bus-selection state assumed by the bus device being denominated the bus selected by the bus device;
   B) bus-driving circuitry for:
      i) placing identical information on all of the buses at a designated time slot when operating properly and
      ii) performing retransmission of that information in a different time slot in response to an error-broadcast signal indicating an error in information placed on any bus during the designated time slot, regardless of whether that bus is the bus selected by the bus device;
   C) error-detection circuitry for monitoring for errors the bus selected by the bus device; and
   D) error-broadcast circuitry for:
      i) applying to the communications channel an error-broadcast signal indicating the presence of an error on that bus in response to detection by the bus device of an error in the information thereon, but
      ii) applying to the communications channel no error-broadcast signal indicating the presence of an error on any bus in the absence of detection by the bus device of an error on the bus selected by the bus device.

22. A bus device as defined in claim 21 wherein the obey logic, in the absence of an error-broadcast signal representing an error on a given bus not selected by the bus device, responds to an error-broadcast signal representing an error on the bus selected by the bus device by assuming the bus-selection state associated with the given bus.

23. For use in a digital data-processing system comprising a communications channel, including a plurality of duplicated information-carrying buses, for carrying error-broadcast signals placed in the channel in response to detection of errors in the information that the duplicated buses carry, a bus device comprising:
   A) obey logic causing the bus device alternatively to assume a plurality of bus-selection states, each of which is associated with a different one of the buses, the bus associated with the bus-selection state assumed by the bus device being denominated the bus selected by the bus device, the obey logic, in the absence of an error-broadcast signal representing an error on a given bus not selected by the bus device, responding to an error-broadcast signal representing an error on the bus selected by the bus device by causing the bus device to assume the bus-selection state associated with the given bus; and
   B) bus-driving circuitry for:
      i) placing identical information on all of the buses at a designated time slot when operating properly and
      ii) performing retransmission of that information in a different time slot in response to an error-broadcast signal indicating an error in information placed on any bus during the designated time slot, regardless of whether that bus is the bus selected by the bus device.

* * * * *